United States Patent [19]

Patterson

[11] Patent Number: 4,848,696
[45] Date of Patent: Jul. 18, 1989

[54] FREE SPOOL ADAPTER FOR SPINNING REEL

[76] Inventor: James A. Patterson, 2074 20th St., Sarasota, Fla. 34234

[21] Appl. No.: 281,249

[22] Filed: Dec. 6, 1988

[51] Int. Cl.$^4$ ............................................. A01K 89/02
[52] U.S. Cl. ...................................................... 242/246
[58] Field of Search .................... 242/84.2 R, 84.5 R, 242/84.5 A, 84.51 A, 84.51 R; 464/45

[56] References Cited

U.S. PATENT DOCUMENTS

| | | | |
|---|---|---|---|
| 2,739,767 | 3/1956 | Dunkelberger | 242/84.2 R |
| 2,858,998 | 11/1958 | Nadolskey | 242/84.5 R |
| 2,890,004 | 6/1959 | Whitbeck | 242/84.2 R |
| 3,027,113 | 3/1962 | Berger | 242/84.51 A X |
| 3,693,901 | 9/1972 | Lilland | 242/84.2 R |
| 4,106,718 | 8/1978 | Catignani | 242/84.2 R |

FOREIGN PATENT DOCUMENTS 470695 8/1937 United Kingdom ........... 242/84.2 R

Primary Examiner—Stuart S. Levy
Assistant Examiner—Katherine Matecki
Attorney, Agent, or Firm—Charles J. Prescott

[57] ABSTRACT

An adapter for a spinning-type fishing reel which replaces its existing "star" drag adjustment nut positioned on its main shaft at the front end of the reel against its spool. The adapter includes a cam lock and flat disc. The disc has a central aperture sized to slidably fit onto the main shaft of the reel and against the drag device of the reel, the drag device structured by axial pressure against the spool to vary resistance to rotation of the spool. The cam lock includes a mounting tube and a cam pivotally connected thereto. The mounting tube has longitudinal threads for rotating engagement and axial adjustment on the main shaft. With the disc positioned between the cam lock and against the drag device, the cam, having at least two pivotal positions with respect to the mounting tube, provides at least two different resistances to spool rotation simply by quickly pivoting the cam to one of its positions. The lesser resistance is adjustable to provide a desired "free spooling" of the fishing line from the spool when the reel's bail is in its closed position. A free spool nut jam may also be provided to insure a broader range of adjustability of the resistance to spool rotation between a normal drag setting and any desired, lesser "free spooling" drag setting.

4 Claims, 2 Drawing Sheets

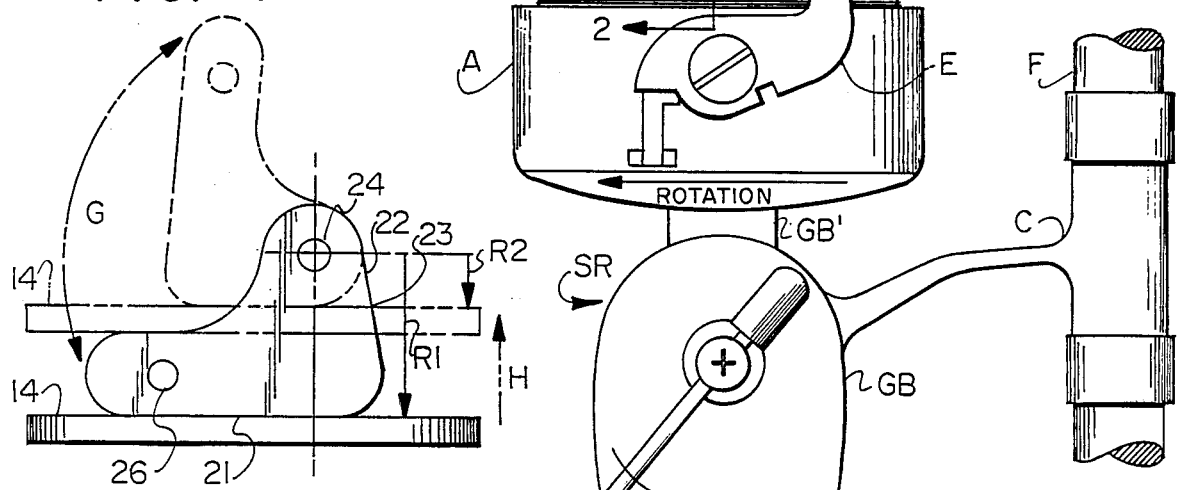
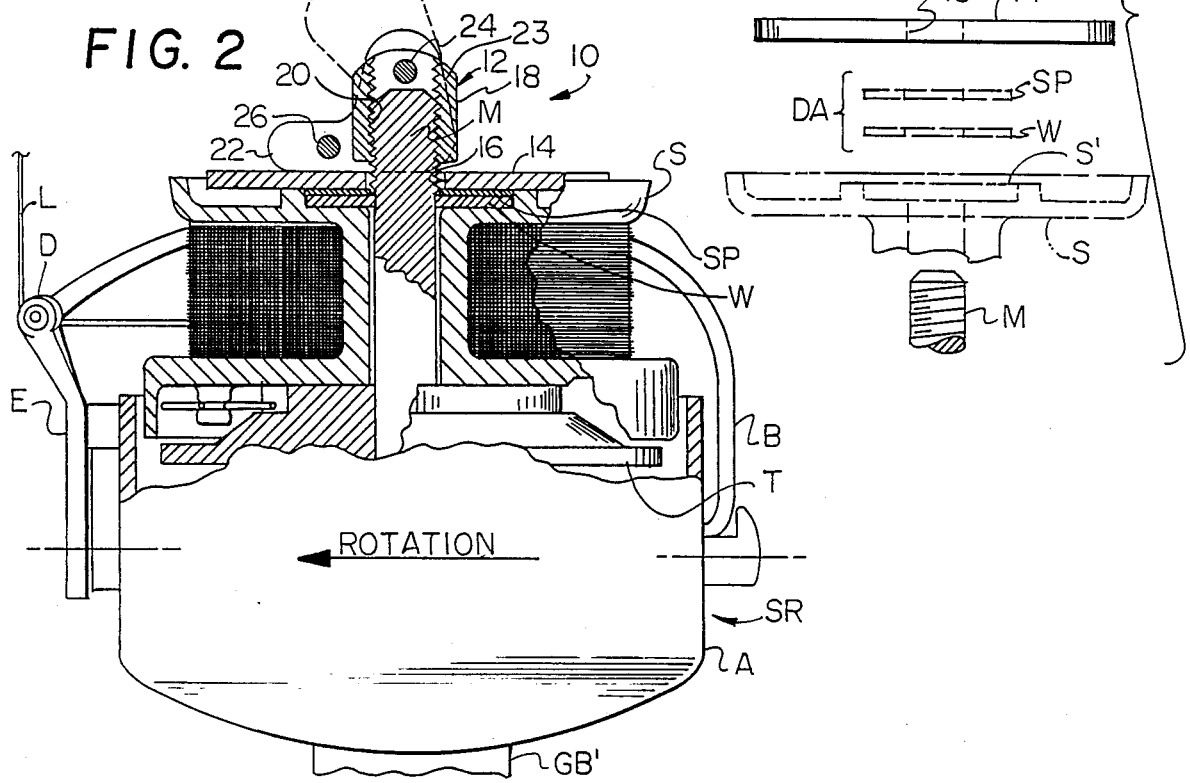

FREE SPOOL ADAPTER FOR SPINNING REEL

BACKGROUND OF THE INVENTION

This invention is directed to a spinning-type fishing reel, and more particularly to an adapter which replaces the existing drag adjustment nut of such reels for quick, enhanced selection of drag setting between normal drag and a "free spool" setting.

There are generally available two types of fishing reels. The first type is of the conventional casting type wherein a transversely mounted spool is held for rotation in a housing and wherein fishing line fed therefrom and thereonto is effected only by the appropriate rotation of the spool. Such conventional casting reels afford an acceptable degree of control in their "free spool" setting wherein a fish striking the lure may run with the lure taking line from the spool as it rotates. At the appropriate time, the user may interrupt this "free spooling" to quickly prevent the spool from further low- or no-drag rotation and to reestablish a preselected normal drag setting. Thereafter, the normal drag setting selected allows retrieving of the fishing line onto the spool.

A serious drawback to these conventional transversely mounted casting-type fishing reels is their limited ability to cast a lure. Because the spool must rotate as line is fed out even in the "free spooling" setting, the inherent inertia and resistance to rotation of the spool, coupled with rapid line removal during a cast limits the casting distance capability of these fishing reels.

Spinning-type fishing reels were developed as a substantial improvement in casting ability over conventional casting reels. In these spinning-type fishing reels, the spool is held from rotation in all situations of use except during "free spooling" or against normal drag resistance. A separate rotatable housing is provided which includes a pivotally mounted two-position bail arrangement. In its closed position, the bail feeds the line around and onto the spool when the handle of the reel is rotated. In its open position, the line on the spool is completely free of the bail and may be pulled off of the spool without interference and without movement from any part of the fishing reel. This open-bail position thus greatly enhances the castability of such fishing reels.

However, another inherent drawback to spinning-type reels currently exists vis-a-vis conventional transverse mounted spool casting reels. This limitation is with respect to the "free spooling" feature of conventional casting reels. All modern spinning-type fishing reels are provided with a drag or "star" adjustment nut which is threadably engaged onto the front end of the main shaft of the reel. By rotating this drag adjustment nut, the resistance to rotation of the spool is gradually varied. However, this drag adjustment is only with respect to the spool when the bail is in its closed position. This drag setting has absolutely no effect when the bail is in its open configuration.

Thus, the user is faced with allowing a fish to strike the lure when the bail is in its open position wherein line may be stripped from the spool in a totally unencumbered fashion which may lead to uncontrolled and erratic removal of line from the spool and even knotting and tangling of the line. Alternately, when the bail is in its closed position and a fish strikes the lure, a great deal of resistance based upon the drag adjustment nut setting is encountered by the fish which in many cases will result in the line breaking because of the suddenness of the intensity of the fish strike against a high resistance. Trying to manually manipulate conventional drag adjustment nuts between a low drag setting to facilitate "free spooling" and a normal drag setting for setting and retrieving a lure with fish is practically impossible.

One device known to applicant which in some respects addresses this problem with respect to open face spinning reels is disclosed in U.S. Pat. No. 4,591,108 currently being marketed by Shimano Corporation. This invention is directed to an additional adjustable knob and drag lever disposed at the rear of the reel and functions somewhat differently from that of the present invention.

The present invention provides an adapter which allows spinning-type fishing reels to function in virtually the same manner as the conventional casting reels whereby, when a bail is in its closed position, the fishing line will "free spool" from the spool in a low-or no-drag setting, but allows the fisherman to quickly reestablish normal drag after a fish has struck and taken the lure.

BRIEF SUMMARY OF THE INVENTION

This invention is directed to an adapter for a spinning-type fishing reel which replaces its existing "star" drag adjustment nut positioned on its main shaft at the front end of the reel against its spool. The adapter includes a cam lock and flat disc. The disc has a central aperture sized to slidably fit onto the main shaft of the reel and against the drag device of the reel, the drag device structured by axial pressure against the spool to vary resistance to rotation of the spool. The lock cam includes a mounting tube and a cam pivotally connected thereto. The mounting tube has longitudinal threads for rotating engagement and axial adjustment on the main shaft. With the disc positioned between the cam lock and against the drag device, the cam, having at least two pivotal positions with respect to the mounting tube, provides at least two different resistances to spool rotation simply by quickly pivoting the cam to one of its positions. The lesser resistance is adjustable to provide a desired "free spooling" of the fishing line from the spool when the reel's bail is in its closed position. A free spool jam nut may also be provided to insure a broader range of adjustability of the resistance to spool rotation between a normal drag setting and any desired, lesser "free spooling" drag setting.

It is therefore an object of this invention to provide an adapter for spinning-type fishing reels which facilitates quick and easy selection of "free spooling" or normal drag.

It is another object of this invention to provide an adapter for spinning-type fishing reels which provides at least two distinctively separate drag settings for operation in the "closed bail" configuration of the reel.

It is yet another object of this invention to provide an adapter for spinning-type fishing reels which is useable retroactively in conjunction with both existing equipment as well as currently manufactured spinning-type fishing reels.

In accordance with these and other objects which will become apparent hereinafter, the instant invention will now be described with reference to the accompanying drawings in which:

BRIEF DESCRIPTION OF THE DRAWINGS

FIG. 1 is a left-side elevation view of a typical open spool spinning-type fishing reel with the invention connected thereto.

FIG. 2 is a section view in the direction of arrows 2—2 in FIG. 1.

FIG. 3 is an exploded view of the preferred embodiment of the invention with respect to a conventional drag assembly disposed at the front face of a spool with respect to the main shaft of the fishing reel.

FIG. 4 is a side schematic view of the operation of the invention shown in FIG. 1.

DETAILED DESCRIPTION OF THE INVENTION

Figure 5:
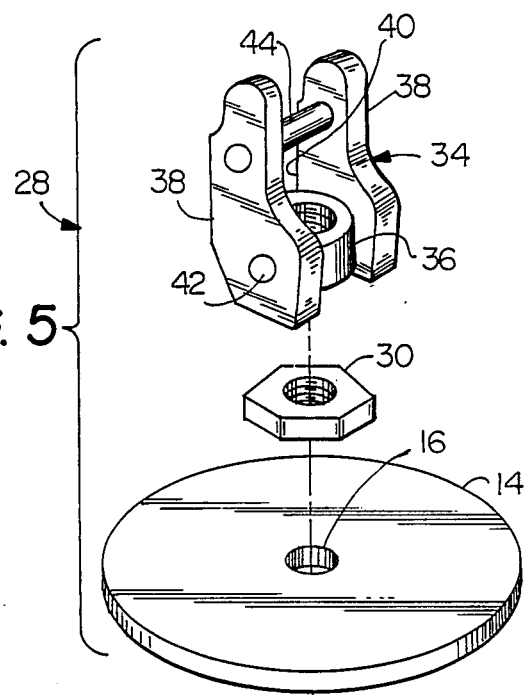
FIG. 5 is an exploded perspective view of another embodiment of the invention.

Referring now to the drawings, and particularly to FIGS. 1 to 4, the preferred embodiment of the invention is shown generally at numeral 10. The adapter 10 includes a cam lock 12 and a generally flat pressure plate or disc 14. The cam lock 12 includes a pair of mating, generally flat cams 22 held in spaced apart relationship by pivotal connection on shaft 24 to a centrally positioned mounting tube 18 so that, as best seen in FIG. 4, the pair of cams 22 may be pivoted back and forth in the direction of arrow G. A separate cross shaft 26 connected between the pair of cams 22 is also provided for additional rigidity and for providing an additional hand grasping location.

The mounting tube 18 includes a longitudinal threaded aperture 20 therethrough which is sized to threadably engage onto, and be thus longitudinally positionable with respect to, the distal end of a mounting shaft M of an open spool spinning-type fishing reel shown generally at SR.

The fishing reel SR includes gear box 6B operably connected to handle H which is rotatable in the direction of the arrow. A mounting plate C is provided for interconnection in the well known manner to a fishing rod F. Spool S, containing a quantity of fishing line L wrapped therearound, is mounted rotationally fixed onto the main shaft M and held thusly otherwise without the benefit of the present invention by a conventional drag or "star" adjustment nut which is threadably engageable onto the distal end of main shaft M. Main shaft M is also held fixed from rotation mounted in plate T which, in turn, is reciprocated longitudinally back and forth responsive to rotation of handle H. A bail arrangement B is also provided on spinning-type fishing reels which is held for pivotal operation on rotatable housing A. Spool S is also reciprocated longitudinally back and forth on the main shaft M by rotationally fixed plate T as handle H is rotated. The bail B has two positions, an open and a closed position. The bail B is shown in FIGS. 1 and 2 in its closed position wherein fishing line guide D interengages the fishing line L as shown. In this configuration, as housing A, carrying bail B is rotated in the direction indicated by rotating handle H, the fishing line L is wrapped and collected onto spool S, uniformly so by the longitudinal reciprocation of spool S.

In normal use, the bail B is opened to its open position wherein, by normal finger retention of the fishing line, casting of the lure may be accomplished. In this configuration, the bail B and guide D are completely aside of spool S so that the fishing line may be taken from the spool S, without its rotating, in uninhibited fashion.

It should be noted that inherent in the design of spinning-type fishing reels, the spool S does not rotate except against drag resistance as described herein, but rather only reciprocates longitudinally so that the fishing line L may be evenly distributed onto the spools by the rotation of housing A and bail B in its closed configuration. However, when bail B is in its closed position, a preselected amount of tension on fishing line L will cause the spool S to rotate against friction between the mating surface of washer W, fixedly held from rotation on main shaft M, against the forward surface S' of spool S as best seen in FIG. 3.

Because existing spinning-type fishing reels must be operated only from one of the two above-described positions of bail B, and because these exising reels only include a simple drag adjustment nut threadably engaged onto the end of mounting shaft M, as previously described, only a limited selection of "drag" settings is readily available to the user. This drag function is affected by tightening the drag adjustment nut (not shown) onto the main shaft M whereby a conventional drag assembly shown generally at DA in FIGS. 2 and 3 is acted upon. By this arrangement, washer W and spring SP are compressed against the forward face S' of spool S. Thus, by tightening the standard drag adjustment nut, friction is increased between washer W and surface S' of spool S to increase resistance to rotation of the spool S and, thus the outfeeding of fishing line L therefrom when the bail B is in its closed position.

In use, however, many fishermen wish to allow fish to strike the lure with very little resistance to allowing the fishing line L to be extended or drawn from the fishing reel. The only way presently available except for the prior art previously discussed, is to loosen the drag adjustment nut by several revolutions with respect to the main shaft M. When a fish would then strike the lure, with the bail B in its closed position, the tension applied to fishing line L causes spool S to rotate to allow the fish to run or "free spool". Thereafter, the user must quickly retighten the drag adjustment nut to a "guessed at" drag setting to set the lure and to thereafter retrieve the lure and fish. This procedure is at very best only a "guesstimate" of drag setting and, if too tight, will result in fishing line breakage, if too loose excess line will be let out before another readjustment of the drag setting may be made.

The present invention 10 replaces the drag adjustment nut, but continues to utilize the existing drag assembly DA. Disc 14, having aperture 16 therethrough, is slidably engageable and freely rotatable over the main shaft M and provides the substitute bearing surface against surface S' of spool S that the drag adjustment nut previously engaged against. Mounting tube 18, by threadable engagement onto the main shaft M, provides one aspect of the drag adjustment feature of the present invention. As best seen in FIG. 4, when the pair of cams 22 are in the position shown in phantom or in the invention's "free spool" orientation, the disc 14 is allowed to move forward on the main shaft M in the direction of arrow H to the position shown in phantom whereupon rotationally inhibiting friction between rotatably fixed washer W and spool S is decreased to a preselected minimum. This forwardly "free spool" position of disc 14 with respect to the drag assembly DA is adjusted by suitable threading and longitudinal positioning of mounting tube 18 along main shaft M. Thereafter, the pair of cams 22, when rotated counterclockwise as seen in FIG. 4 about shaft 24 to the position shown in solid, force disc 14 rearwardly on main shaft M so as to increase tension on the drag assembly DA and to increase the friction force between washer W and surface S' of spool S.

Thus, by this arrangement, two separate drag resistances between washer W and surface S' acting to resist spool S from rotating and outfeeding fishing line when the bail B is closed are provided. The first setting wherein the cam 22 is in its open configuration, the resistance to spool S rotation is minimal, allowing "free spooling". In this configuration, although fishing line M may be easily drawn from spool S by a fish, nonetheless an aspect of control by the rotation of spool S is maintained. After a fish has struck and withdrawn sufficient line L, the user may quickly pivot the pair of cams 22 to their locked configuration, thus quickly achieving a preselected normal drag setting so that the lure may be set and the fish quickly retrieved thereafter.

It should be now clear from the previous discussion that the configuration of cams 22 is determinative of the span between the "free spool" drag setting when the cam lock 12 is open and the normal drag setting associated with the closed configuration of the cam lock 12. This span or spread between the drag settings is proportional to the ratios of the radii R1 and R2 of surfaces 21 and 23, respectively of the pair of cams 22.

Referring now to FIGS. 5 to 8, another embodiment of the invention is shown generally at numeral 28 and includes a cam lock 34, disc 14 as previously described, and jam nut 30. The cam lock 34 includes a pair of cams 38 and 40 held for pivotal movement by pin 42 with respect to mounting tube 36 as shown. Pin 40 add additional strength and stability to the spaced arrangement of cams 38 and 40. Again, mounting tube 36 is internally threaded to engage onto the main shaft M of the fishing reel as previously described.

Figure 8:
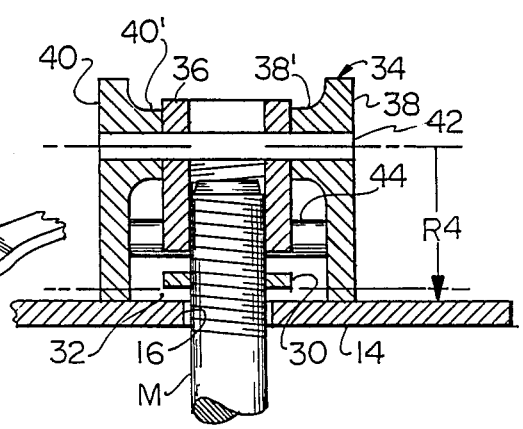
FIG. 8 is a section view in the direction of arrows 8—8 in FIG. 6.

In this embodiment 28, the cams 38 and 40 are spaced further apart by the addition of bosses 38' and 40' so as to provide clearance for jam nut 30 as best seen in FIG. 8. Cams 38 and 40 have two mating cooperative surfaces at a distance of R4 from the axis of pin 42 and against the mating surface of disc 14 in their closed or locked configuration and R5, which allows disc 14 to move forwardly with respect to the fishing reel to facilitate the "free spooling" of the present invention as previously described. However, jam nut 30 is also provided so as to offer the user a further refinement in adjustment by wrench R of the "free spooling" drag setting. Thus, as best seen in FIG. 8, disc 14 is allowed to move to contact jam nut 30 when cams 38 and 40 are rotated to their open position. When in this "free spooling" configuration, the user may then adjust jam nut 30 so that the desired "free spooling" drag setting may be achieved. Of course, the user may test this setting by pulling outwardly on the fishing line when the bail B is in its closed position.

Figure 9:
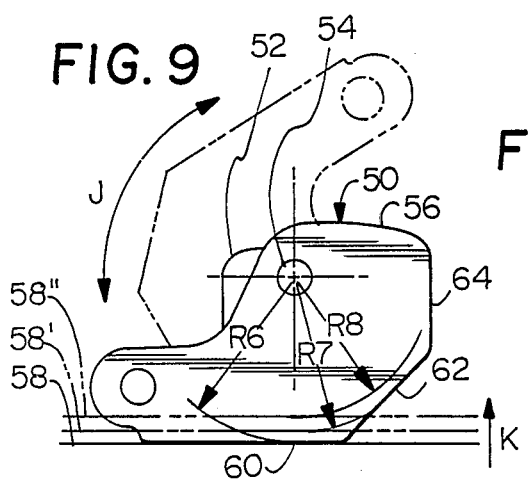
FIG. 9 is a side schematic view of yet another embodiment of the invention.
Figure 7:
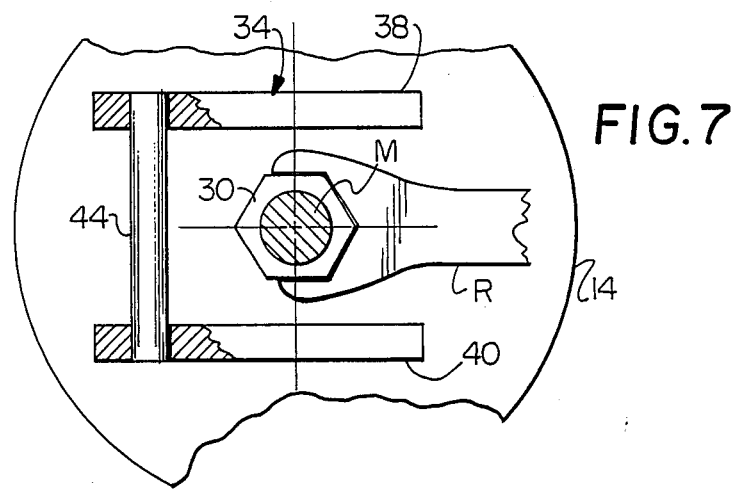
FIG. 7 is a section view in the direction of arrows 7—7 in FIG. 6.
Figure 6:
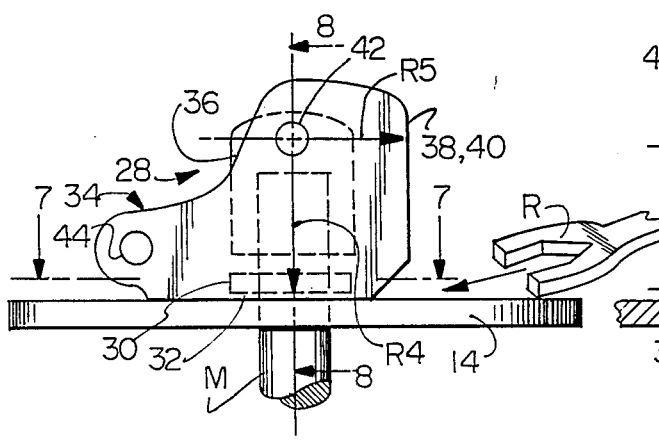
FIG. 6 is a side elevation view of the invention as shown in FIG. 5 disposed on the main shaft of the fishing reel.

Referring lastly to FIG. 9, another embodiment of the cam lock is shown generally at 50 schematically. In this embodiment 50, the cams 64 include three separate surfaces which bear against the disc 14 shown schematically at 58. In their locked configuration, surface 60 of cams 56 at a radius of R6 bear against the disc to keep it as shown in solid at 58. However, as the cams 56 are rotated clockwise in the direction of arrow J, surface 62 at a smaller radius R7 allows the disc to move in the direction of arrow K to position 58'. Further clockwise rotation of cams 56 places surface 64 against the disc in its position at 58". This progressive rotation of the pair of cams 56 reduces the drag or resistance to rotation of the spools in proportion to the length of radii R6, R7 and R8.

Applicant has adapted this embodiment of the invention to a spin reel manufactured by Mitchel, Model #306 A. In this adaptation, applicant choose R6 to equal 0.565 inches, R7 to equal 0.540 inches and R8 to equal 0.500 inches. However, each separate spinning-type fishing reel would require individual tailoring of these desired dimensions, in part based upon the number of individual drag settings desired.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. An adapter which replaces a drag adjustment nut of a spinning-type fishing reel having a main shaft forwardly extending to receive a replaceable line spool and a rotatable housing carrying a bail pivotally connected to the housing and movable between an open and a closed position, said adapter comprising:
    a cam including a mounting tube and at least one lever arm pivotally connected to said mounting tube;
    said mounting tube having a longitudinal threaded aperture therethrough structured for threadable engagement onto, and for longitudinal adjustment with respect to, the main shaft;
    a generally flat disc having a central aperture therethrough structured to slidably engage over the main shaft between said cam and a front surface of a drag device of the reel positioned on the main shaft forwardly of, and acting against, the spool;
    said lever arm pivotable from a first position to a second position;
    said lever arm in its said first position structured to forcibly urge said disc rearwardly on the main shaft a first predetermined distance against the drag device to increase friction resistance to rotation of the spool;
    said lever arm in its said second position structured to release said disc to move forwardly on the main shaft a second predetermined distance away from the drag device sufficiently to decrease resistance to rotation of the spool.

2. An adapter as set forth in claim 1, wherein:
    said lever arm in its second position structured to fully release said disc to move forwardly on the main shaft away from the drag device sufficiently to substantially eliminate friction resistance to rotation of the spool whereby the spool is freely rotatable when the bail is in its closed position.

3. An adapter as set forth in claim 1, wherein:

said lever arm also having at least one intermediate position;

said lever arm in its intermediate position structured to release said disc to move forwardly on the main shaft a third predetermined distance away from the drag device not as large as said second distance so as to cause an intermediate amount of friction resistance to rotation of the spool.

4. An adapter as set forth in claim 1, further comprising:

a free spool nut threadably engageable onto, and for longitudinal adjustment with respect to, the main shaft;

said free spool nut sized to fit between said mounting tube and said disc;

said free spool nut structured to limit forward movement of said disc on the main shaft and to limit the decrease of resistance to rotation of the spool when said lever arm is pivoted to its second position.

* * * * *